United States Patent [19]

Kao

[11] Patent Number: 5,339,246
[45] Date of Patent: Aug. 16, 1994

[54] APPARATUS FOR CORRECTING VEHICULAR COMPASS HEADING WITH THE AID OF THE GLOBAL POSITIONING SYSTEM

[75] Inventor: Wei-Wen Kao, Fremont, Calif.

[73] Assignee: Zexel Corporation Diahatsu-Nissan, Tokyo, Japan

[21] Appl. No.: 852,651

[22] Filed: Mar. 17, 1992

[51] Int. Cl.⁵ .................... G01C 17/38; G06F 15/50
[52] U.S. Cl. .................................. 364/457; 364/449; 342/357
[58] Field of Search ........... 364/449, 454, 559, 571.02, 364/571.03, 457; 342/357, 457; 33/356

[56]  References Cited

U.S. PATENT DOCUMENTS 4,024,382  5/1977  Fowler ................................. 33/356
4,743,913  5/1988  Takai .................................. 342/457

*Primary Examiner*—Thomas G. Black
*Assistant Examiner*—Michael Zawelli
*Attorney, Agent, or Firm*—Harold L. Burstyn

[57]  ABSTRACT

An apparatus for compensating a magnetic heading as indicated by a vehicle's magnetic compass so that the magnetic heading corresponds to a true heading as indicated by signals received in the vehicle from the Global Positioning System. The apparatus includes a computer for calculating compensation factors from successive positions occupied by the vehicle as it travels.

4 Claims, 12 Drawing Sheets

APPARATUS FOR CORRECTING VEHICULAR COMPASS HEADING WITH THE AID OF THE GLOBAL POSITIONING SYSTEM

BACKGROUND OF THE INVENTION

The present invention relates to in-vehicle navigation systems and, more particularly, to in-vehicle navigation systems employing a terrestrial magnetic sensor (magnetic compass) aboard the vehicle to derive at least part of its guidance information.

Because a motor vehicle contains large amounts of iron and steel, a magnetic compass on board the vehicle suffers the effects of a local magnetic field and cannot point even to magnetic north, let alone to true north. Some form of calibration of the compass is required before it can be used reliably to show direction.

Japanese Patent Application First Publication No. (Tokkai) Sho 58-48811 proposes a method for calibrating a magnetic compass on board a vehicle. However, this method, like similar methods long used aboard ships, requires that the vehicle travel in a complete circle. Further, the calibration that results is valid only in the immediate vicinity of the place where it was performed, because the local magnetic field of the vehicle is both time- and location-dependent. Compensation for long-term use cannot rely on a single calibration.

In a hybrid vehicle navigation system that contains both a magnetic compass and a Global Positioning System ("GPS") receiver, however, true heading can be determined from GPS signals and used to calibrate the compass in real time.

U.S. Pat. No. 4,743,913 discloses several methods for compensating magnetic compass headings from a GPS-derived absolute heading. These methods require that the compass be of the flux-gate type.

In the first method, one determines the center of the magnetic circle from the compass coil voltages of a flux-gate compass by passing two lines through the coil voltages and determining their slope from the absolute headings derived from signals from the GPS.

The second method avoids incorrect headings by measuring absolute heading only when the vehicle travels along a straight road, where straightness is determined by a steering-wheel sensor or other signal processing means.

In the third method, one assumes that the radius of the circle of magnetization, which radius corresponds to the strength of the magnetic field; the compass coil voltages; and the absolute heading for a single point (derived from the GPS signals), are known. The center of the magnetization circle then lies along a line, whose slope is determined from the absolute heading, at a distance from the single point that is equal to the radius of the circle.

All these methods require compass coil voltages from, for example, a flux gate compass. Also, it is necessary to know the strength of the magnetic field in order to use the above methods. In some systems, it is more convenient to process separately the X and Y outputs of the flux gate compass to produce a magnetic heading signal. This is not a satisfactory input for the referenced system. Hence the methods presently known have significant disadvantages.

OBJECTS AND SUMMARY OF THE INVENTION

An object of the present invention is to provide a method for compensating a vehicular compass with the aid of the GPS that does not have the disadvantages of present methods.

A further object of the present invention is to compensate a vehicular compass continuously so that it shows the true heading of the vehicle substantially all the time.

Still a further object of the present invention is to provide a number of ways to calculate the compensation required for a vehicular compass by using signals from the GPS.

Briefly stated, the present invention provides a method and apparatus to compensate a magnetic heading as indicated by a vehicle's magnetic compass so that the magnetic heading corresponds to a true heading as indicated by signals received in the vehicle from the Global Positioning System. The method calculates compensation factors from successive positions occupied by the vehicle as it travels.

According to an embodiment of the invention, there is provided a hybrid vehicle navigation system for correcting a magnetic heading to a true heading comprising: means for receiving signals from external to the vehicle, means, responsive to the signals, for determining the true heading, means for detecting a magnetic heading, means for normalizing an amplitude of the magnetic heading, and means for computing, from at least two values of the magnetic heading and without any additional information, a compensation factor that, when used to compensate the magnetic heading, makes the magnetic heading correspond to the true heading.

According to a feature of the invention, there is provided a method for correcting a magnetic heading to a true heading comprising: determining a true heading in response to an external electronic signal, determining a magnetic heading from a magnetic compass, normalizing an amplitude of a magnetic field acting on the magnetic compass, and computing, from at least two values of the magnetic heading and without any additional information, a compensation factor that, when used to compensate the magnetic heading, makes the magnetic heading correspond to the true heading.

According to a further feature of the invention, there is provided a vehicle navigation system comprising: a GPS receiver, means for transforming outputs of the GPS receiver into a true heading, means for indicating a magnetic heading, the means for indicating being required to furnish no other information except the heading, and computing means, responsive to at least two values of the magnetic heading, for producing a compensation factor that, when used to compensate the magnetic heading, makes the magnetic heading correspond to the true heading.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
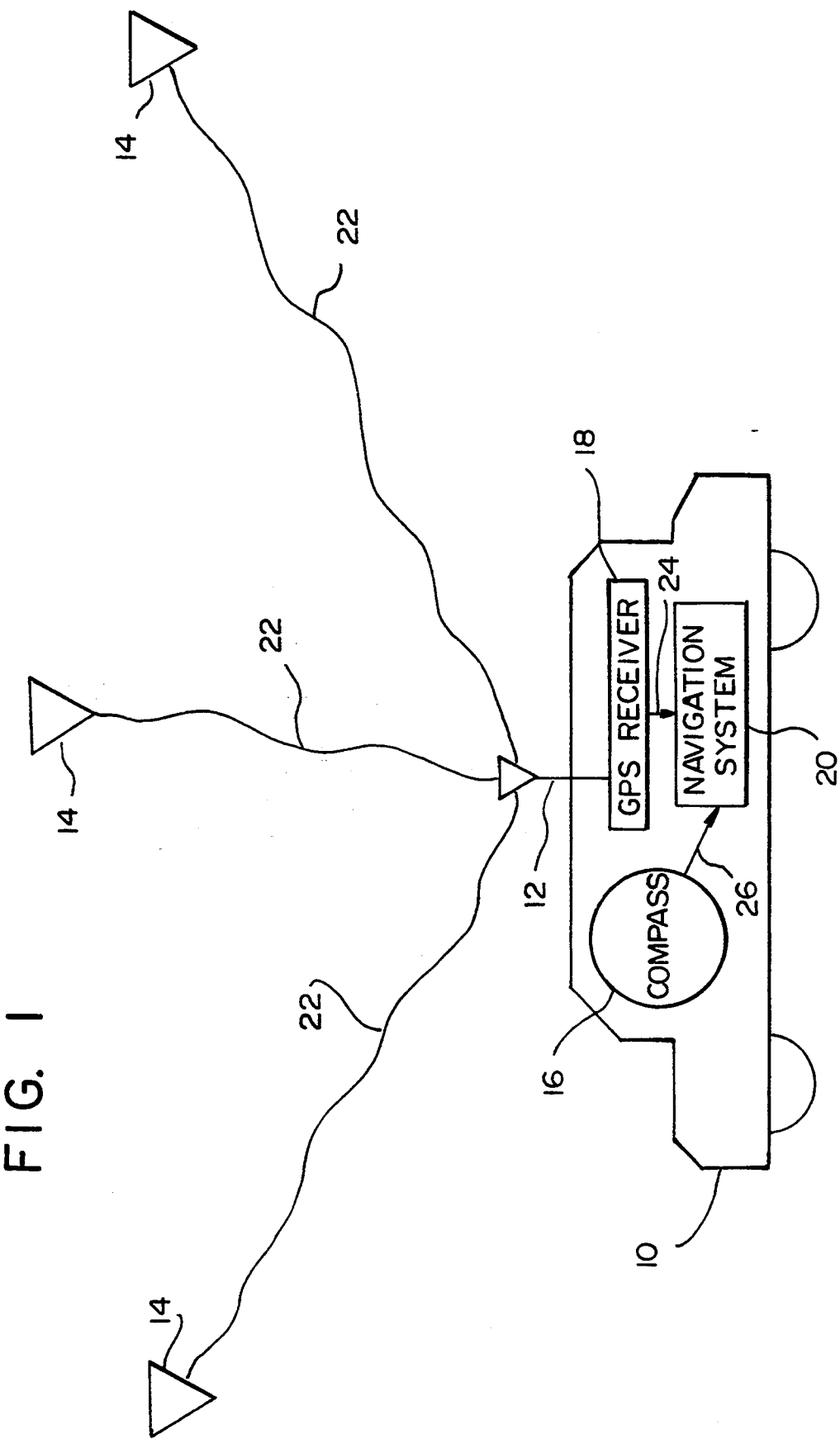
FIG. 1 is a general view of a vehicle equipped with an on-board navigation system.

Referring to FIG. 1, a vehicle 10 moves along a road. An antenna 12 aboard vehicle 10 receives signals from a plurality of GPS satellites 14. Signals 22 from satellites 14, received by antenna 12, are sent to a GPS receiver 18, which calculates an absolute position 24 from them and transmits it to a navigation system 20. A magnetic heading 26 from a magnetic compass 16 is also transmitted to navigation system 20.

Figure 2:
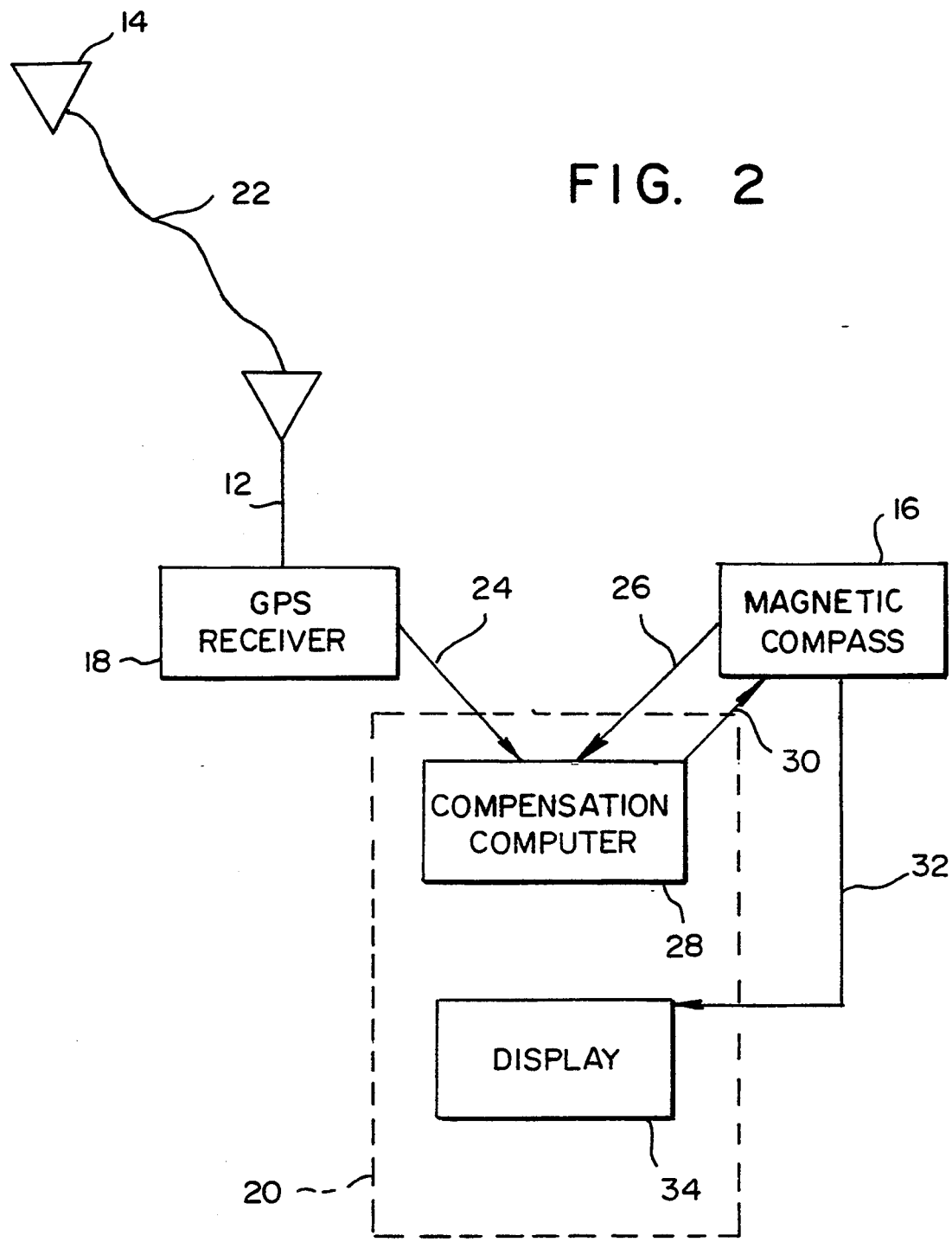
FIG. 2 is a schematic view of the path of signals through the navigation system and associated units.

Referring to FIG. 2, absolute position 24 and magnetic heading 26 are applied to a compensation computer 28. From absolute position 24, compensation computer 28 calculates a compensation factor 30, which is sent back to magnetic compass 16 to compensate it for the local magnetic field. Magnetic compass 16 then sends a corrected heading 32 to a display 34 on which the operator of vehicle 10 sees his true direction of travel.

Figure 3:
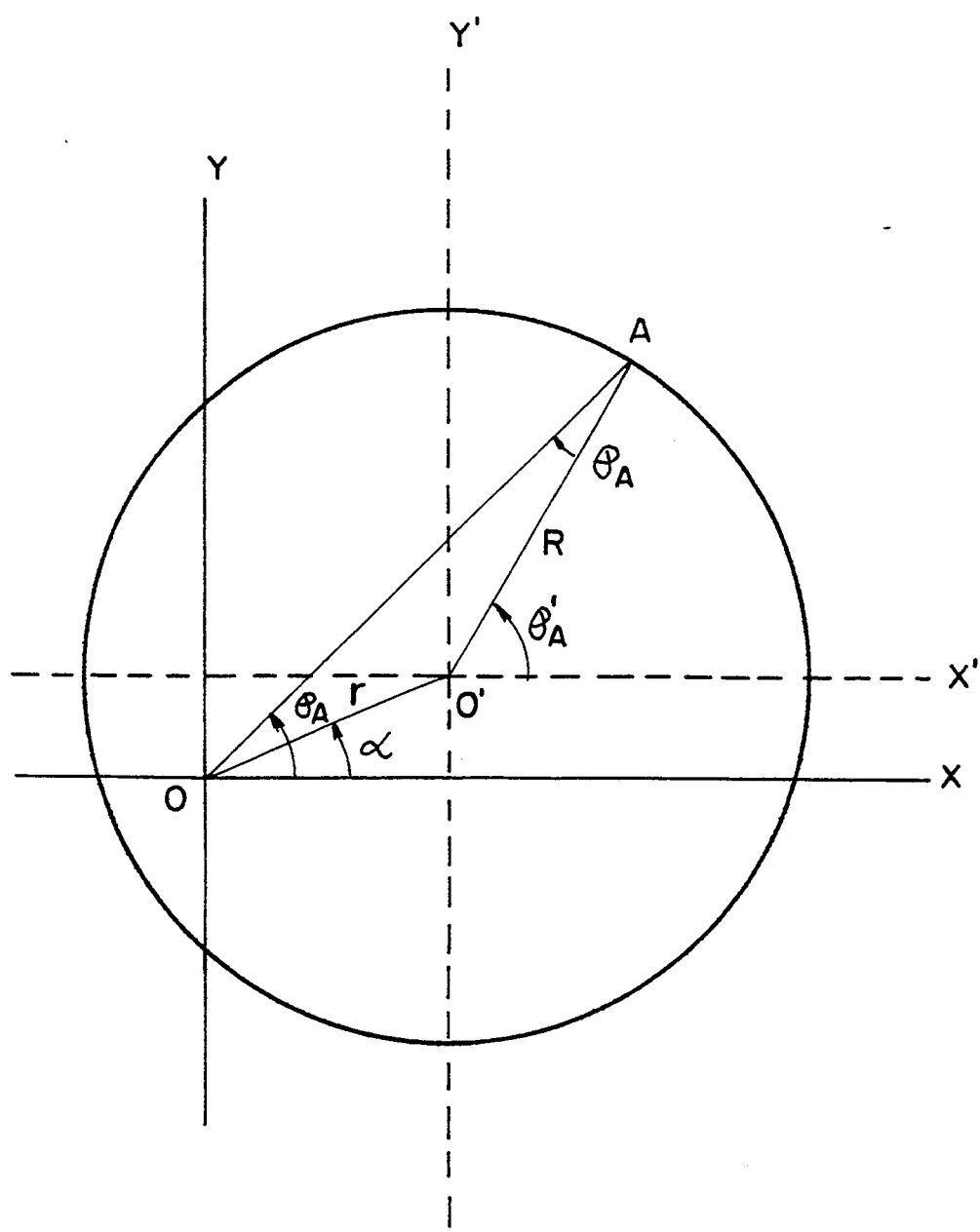
FIG. 3 shows the drift of the circle of magnetization.

Referring to FIG. 3, true heading $\theta_A'$ may be determined by interpreting signals from GPS in GPS receiver 18 in two ways. First, it may be calculated from at least two consecutive absolute positions. Second, it may be computed directly from GPS phase measurements. Given true heading $\theta_A'$ and magnetic heading 26, from magnetic compass 16, equal to $\theta_A$, the bias of measurement $\Phi_A$ is defined as $\theta_A' - \theta_A$. Assuming O' is the drifted center of the circle of magnetization; O, the original center of the circle; R, the radius of the circle; then the magnetization vector OO' has length r and angle α. Trigonometry gives:

$$\sin \Phi_A / r = \sin (\theta_A - \alpha)/R$$

or $$\sin \Phi_A = (r/R) \sin (\theta_A - \alpha).$$

Thus the error of the heading measurement depends on compass heading $\theta_A$, the relative magnitude of magnetization r/R, and the angle of the magnetization vector α. It does not depend on the radius R of the circle of magnetization. Thus, errors induced in prior-art systems by incorrectly sensing the magnitude of radius R are eliminated in the present invention.

Figure 4:
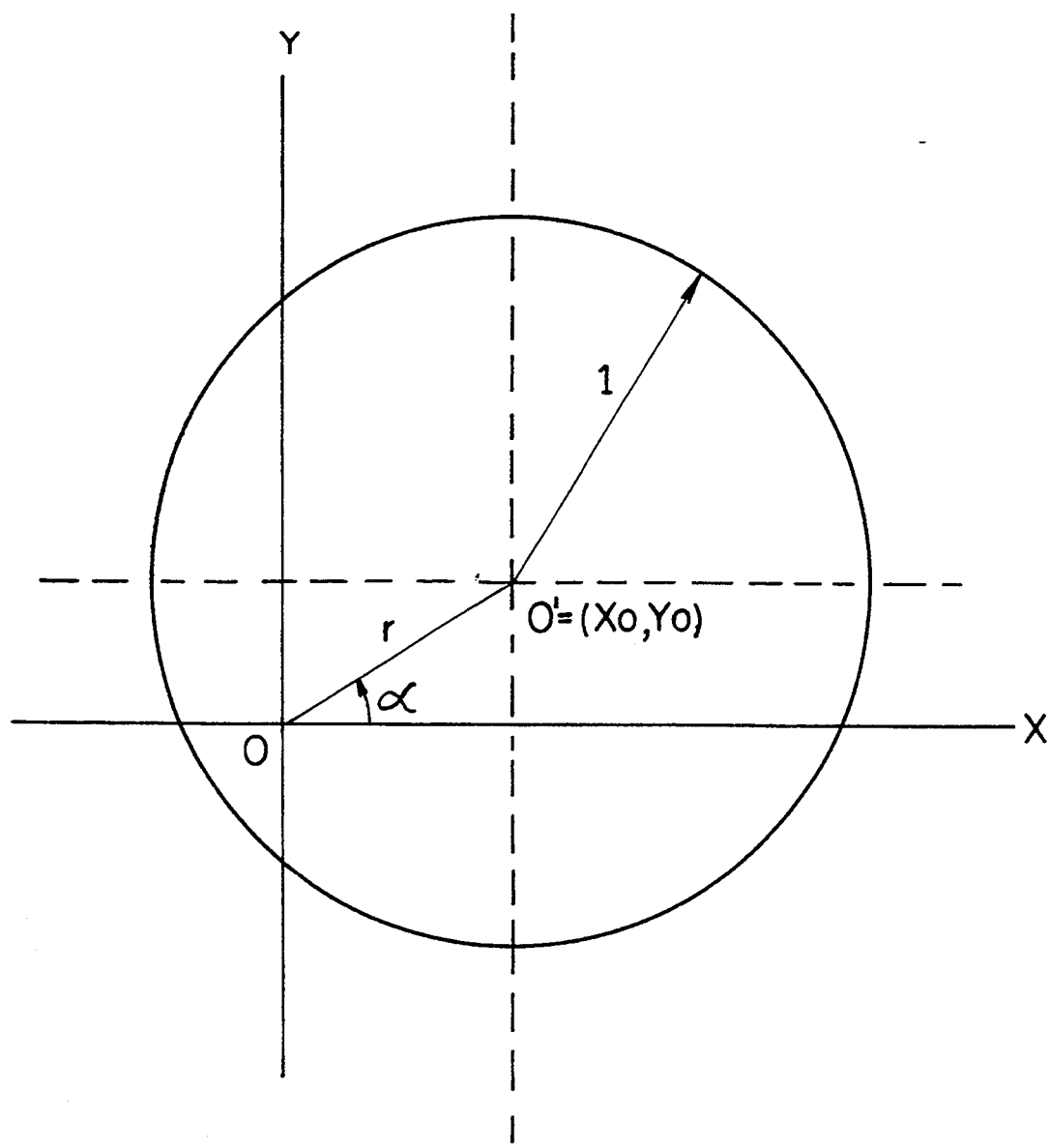
FIG. 4 shows a normalized magnetization circle.

Referring to FIG. 4, to calibrate magnetic compass 16 requires identifying the center of the normalized (radius=1) magnetization circle. The true center coordinates $(X_O, Y_O)$ are not required, which means that compass coil voltages $(X_A, Y_A)$, required by the methods of the prior art, need not be known. Not requiring compass coil voltages means that the present invention does not require direct access to compass coil voltages. Further, not requiring compass coil voltages permits a separate processor to compute the compass direction signals, thereby reducing the load on the main processor in compensation computer 28.

The coordinates of the center of the normalized circle of magnetization are:

$$(X_O, Y_O) = ((r/R) \sin \alpha, (r/R) \cos \alpha).$$

When the center can be determined, one can obtain true heading $\theta_A'$ from the equation:

$$\theta_A' = \theta_A + \sin^{-1} \{(x_O^2 + y_O^2)^{\frac{1}{2}} \sin [\theta_A - \tan^{-1} (y_O/x_O)]\}.$$

Hereafter derivations are based on the normalized circle of magnetization of unit radius shown in FIG. 4. Though the present invention does not require it, the center of the normalized circle may be converted to the center of the actual circle of magnetization by multiplying the coordinates of the center of the normalized circle by radius R of the actual circle.

Figure 5:
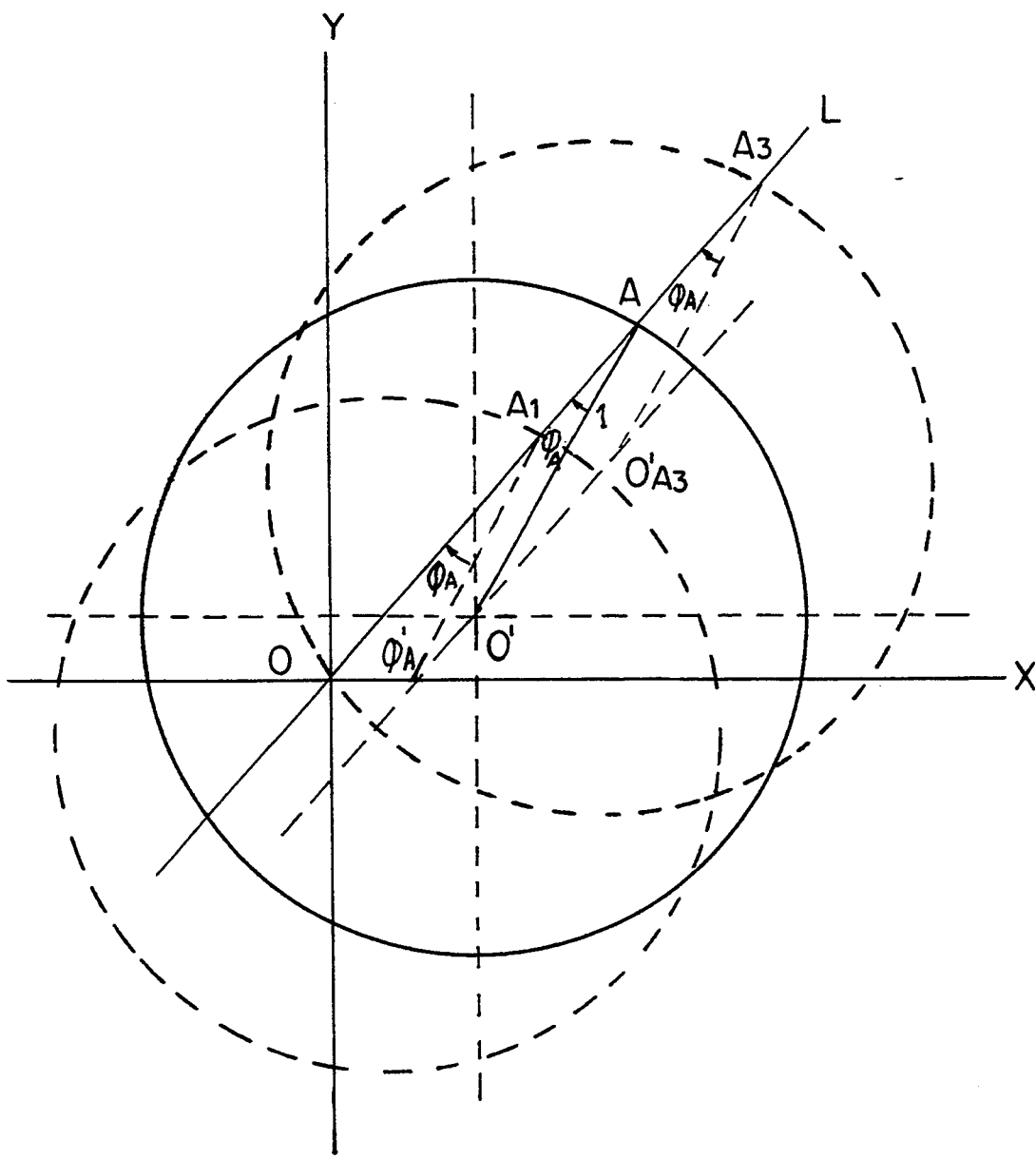
FIG. 5 shows how the center of the magnetization circle is located.

Referring to FIG. 5, given $\theta_A$ as magnetic heading 26, an arbitrary point A will always lie somewhere along a line L that passes through the origin O and has slope tan $\theta_A$. Line L is defined by the equation $y = x \tan \theta_A$, which is equivalent to $x \sin \theta_A - y \cos \theta_A = 0$. The center O' of the normalized circle of magnetization is located at unit distance from A along a line that intersects L with angle $\Phi_A$. However, to determine the location of either A or O' uniquely is impossible from only $\theta_A$ and $\theta_A'$.

Figure 6:
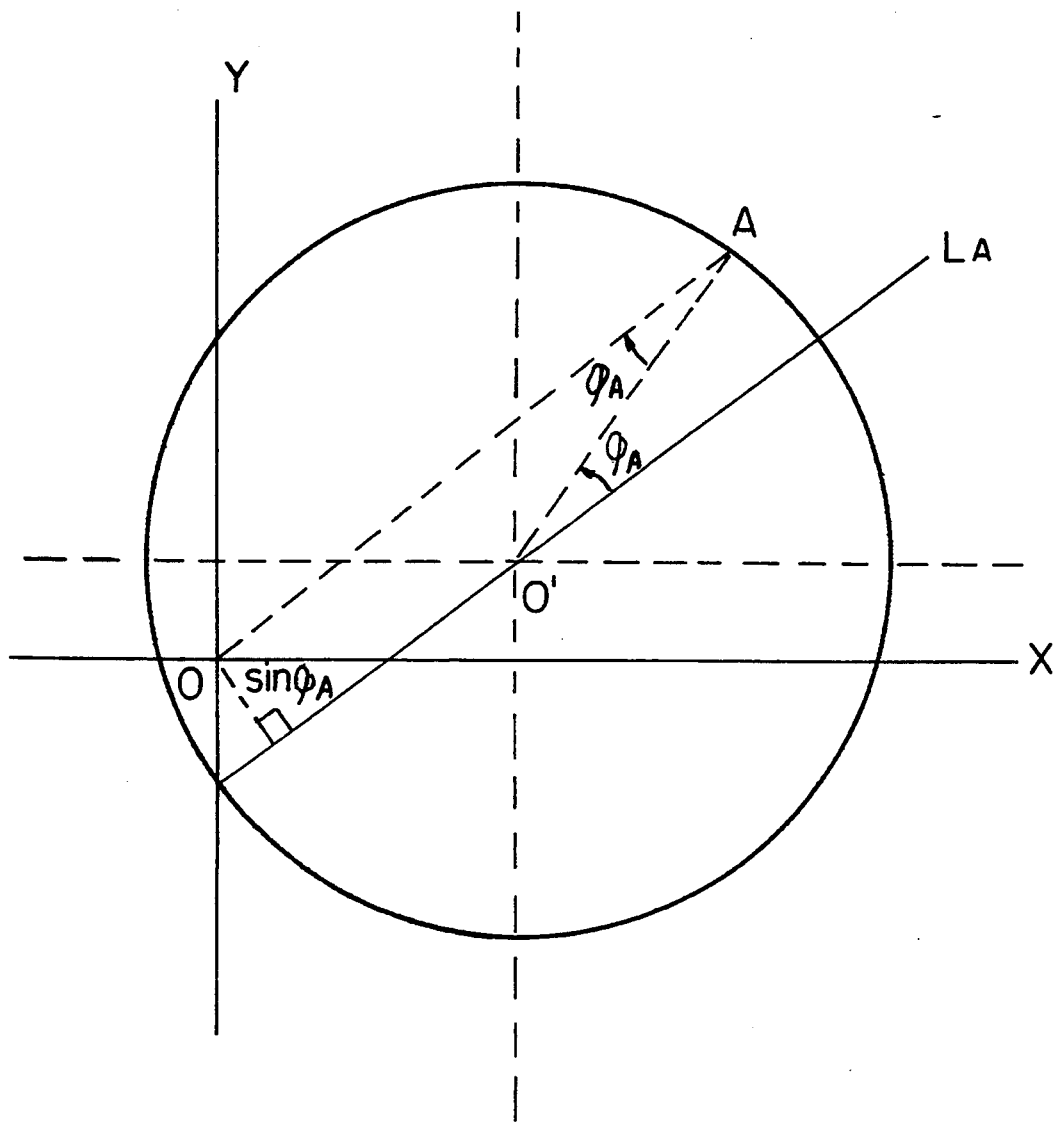
FIG. 6 shows how a solution line is constructed.

Referring to FIG. 6, though O' cannot be determined uniquely from only $\theta_A$ and $\theta_A'$, it must lie on the line $L_A$, which will be called the solution line. The equation of line $L_A$ is:

$$x \sin \theta_A - y \cos \theta_A = \sin \Phi_A.$$

Several methods give the location of the center O' of the normalized circle of magnetization from the solution line and thereby permit the correction of magnetic heading 26 to corrected heading 32 with compensation factor 30.

Figure 7:
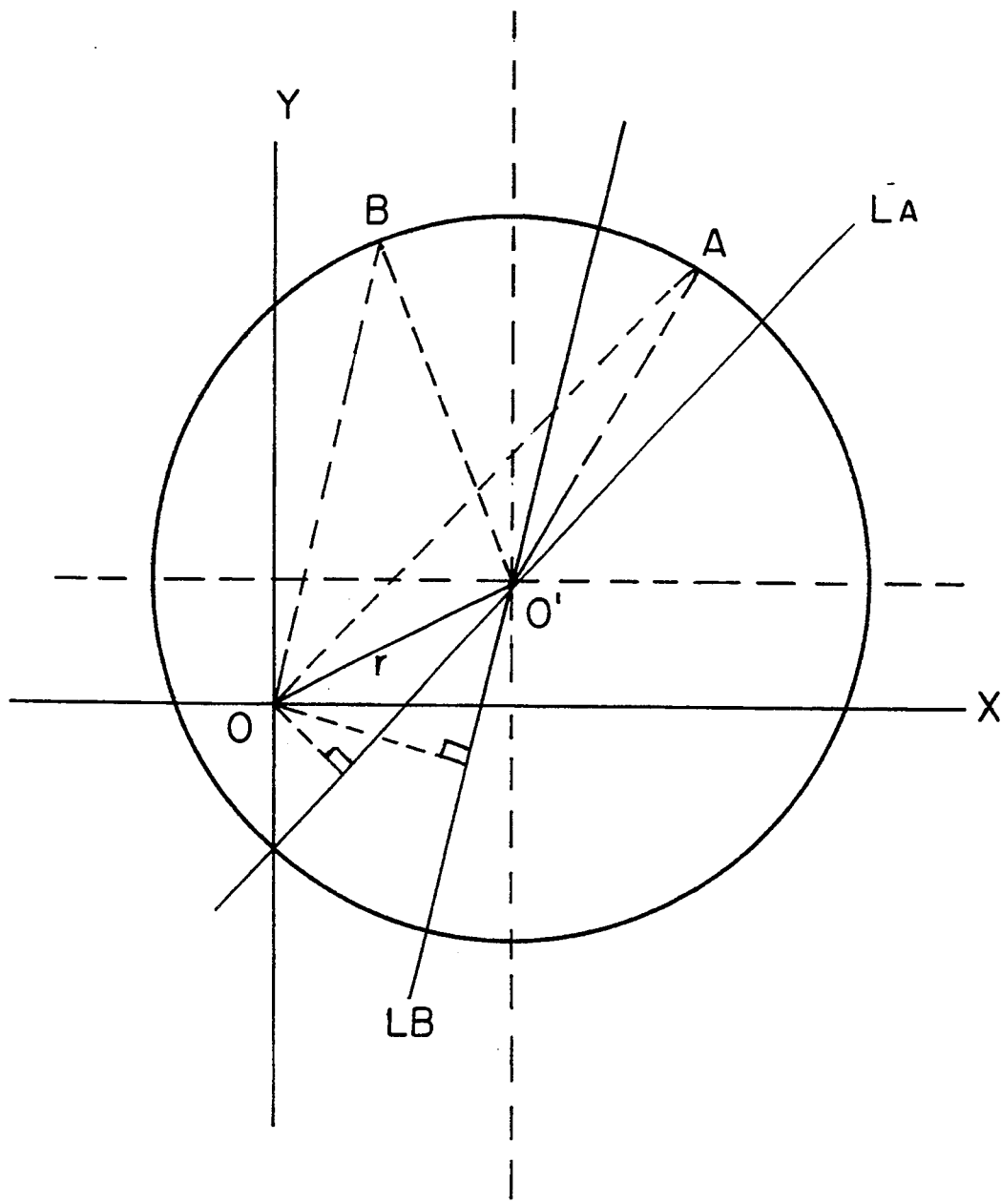
FIG. 7 shows, in a first preferred embodiment of the present invention, how to estimate the center of the magnetization circle using two headings.

Referring to FIG. 7, in a first preferred embodiment, from magnetic heading 26 and a true heading for each of two points A and B, two solution lines $L_A$ and $L_B$ can always be determined, and center O' will lie at their intersection. This first preferred embodiment is the non-recursive method of determining compensation factor 30. However, when $\theta_A$ and $\theta_B$ are nearly the same, $L_A$ and $L_B$ will be nearly parallel. In this case a small change of value in one of the angles will lead to a large change in the location of center O', thereby making it very hard to determine O' accurately. To avoid this difficulty, this non-recursive method should be used only when the difference between $\theta_A$ and $\theta_B$ is greater than a minimum value of, for example, 20 degrees. Thus, vehicle 10 must make a substantial change in direction of more than 20 degrees before the first embodiment of the invention can be used successfully.

Figure 8:
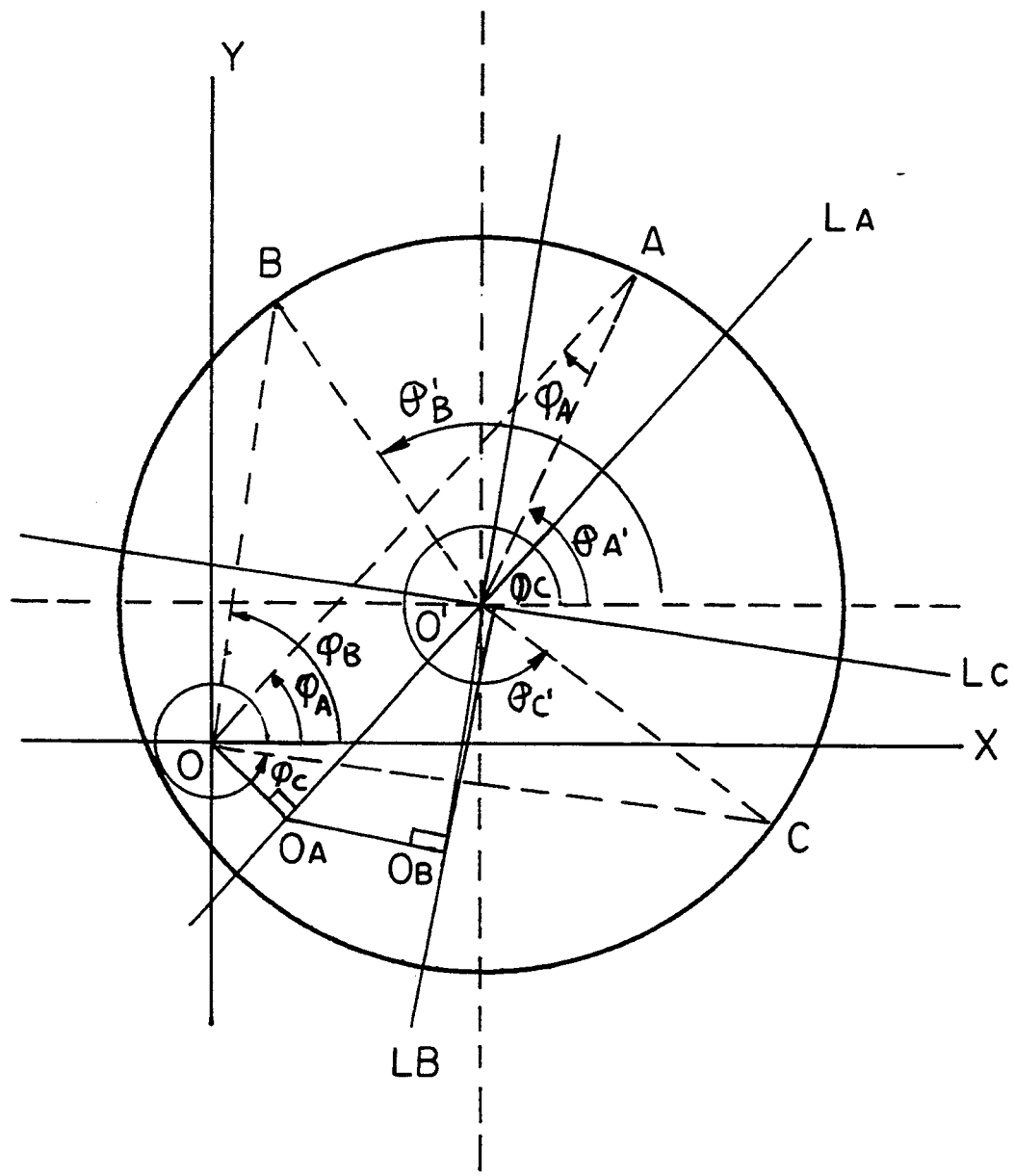
FIG. 8 shows, in a second preferred embodiment of the present invention, how to estimate recursively the location of the center.

Referring to FIG. 8, in a second preferred embodiment, a method of determining the compensation factor 30 estimates the location of O recursively. Take three points A, B, and C on the normalized circle of magnetization. Though their locations are not known exactly, each of points A, B, and C represents a different heading of vehicle 10. Each has a known magnetic heading 26 and a known true heading. From these headings, three solution lines $L_A$, $L_B$, and $L_C$ can be constructed.

The recursive method starts by estimating $O_A$ from $\theta_A$ and $\theta_A'$ according to the equation:

$$O_A = (\sin \Phi_A \sin \theta_A, \sin \Phi_A \cos \theta_A).$$

A second estimate of the center's location, $O_B$, obtained from $\theta_B$ and $\theta_B'$ lies on line $L_B$ at the point closest to $O_A$. Similarly, a third estimate $O_C$, obtained from $\theta_C$ and $\theta_C'$, lies on line $L_C$ at the point closest to $O_B$. Headings for additional points will yield successive approximations that converge on the true location of O. Since the system continuously measures position and true heading angle, the successive approximations quickly converge and, once the true location of O is found, further approximations, beginning with the true location, maintain an updated correct location of O.

In a third preferred embodiment, the non-recursive and recursive methods presented above are combined to accelerate the rate at which the estimated location of the center O of the circle of magnetization converges. If the headings $\theta_A$ and $\theta_B$ are close together, that is, closer than the predetermined value of, for example, 20 degrees that permits use of the non-recursive method, the recursive method of the second embodiment is used to determine the location of $O_B$. If the headings $\theta_B$ and $\theta_C$ are large, that is, greater than the predetermined value that permits the use of the non-recursive method, the non-recursive method is used to determine the location of $O_C$.

In the foregoing, where a change in true heading is required to determine a compensation factor, the change in true heading may be determined by any convenient means. For example, a change in heading determined by GPS may be used. In addition, dead reckoning using, for example, a steering-wheel angle sensor and an odometer, may indicate a suitable change in heading. As a further alternative, a change in magnetic heading, coupled with a distance measurement by an odometer may supply the required angle-change input.

Figure 9:
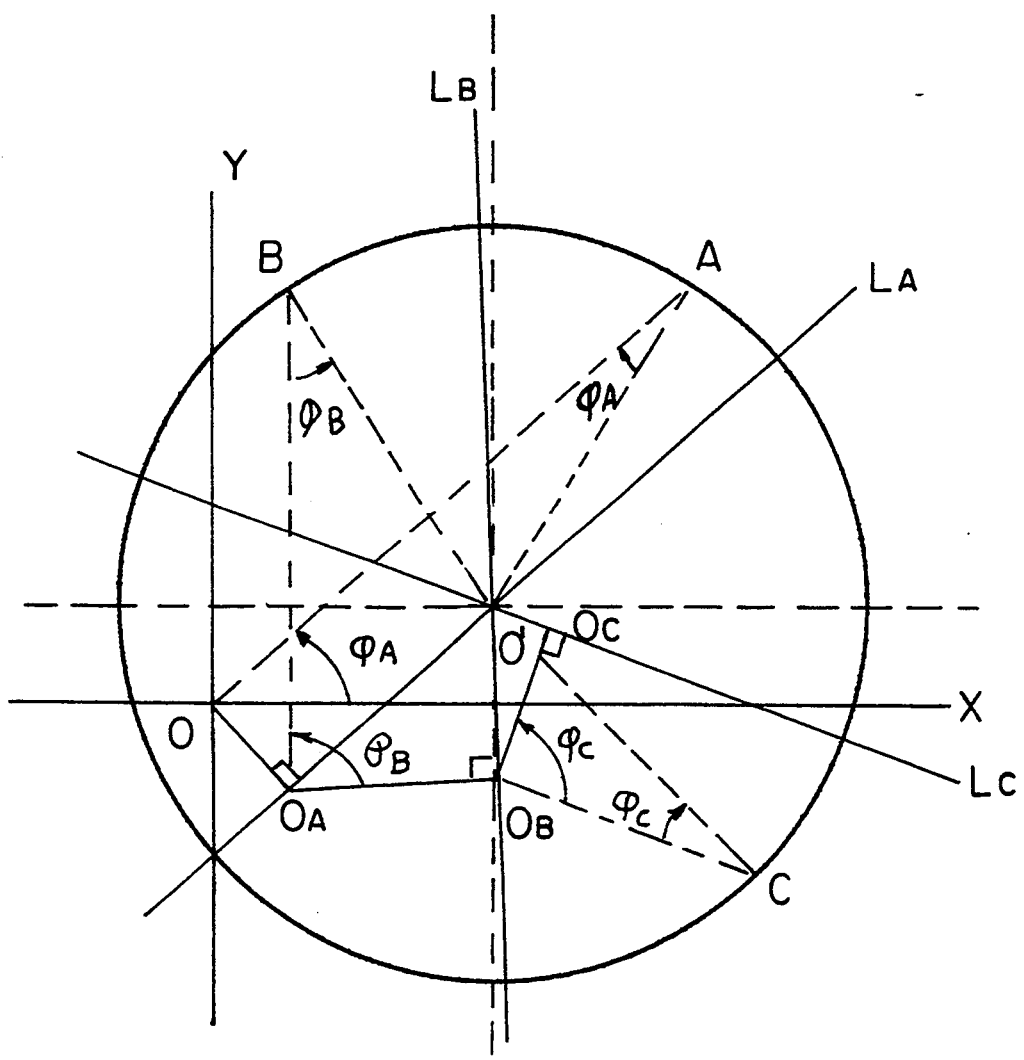
FIG. 9 shows, in a fourth preferred embodiment of the present invention, a modification of the method of recursively estimating the location of the center.

Referring to FIG. 9, in a fourth preferred embodiment, the recursive method for determining the compensation factor 30 that converts magnetic heading 26 to corrected heading 32 is modified. Compensation computer 28 is instructed to apply the estimated location of O to determine compensation factor 30. That is, compensation computer 28 combines the location of $O_{estimated}$ and the offset for $O_{actual}$ and uses the result to determine corrected heading 32. The recursive method then becomes:

(1) estimate $O_A$ from $\theta_A$ and $\theta_A'$ according to the equation:

$$O_A = (\sin \Phi_A \sin \theta_A, \sin \Phi_A \cos \theta_A).$$

(2) estimate $O_B$ from $\theta_B$ and $\theta_B'$ according to equation:

$$O_B = O_A + (\sin \Phi_B \sin \theta_B, \sin \Phi_B \cos \theta_A),$$

where $\theta_B$ and $\Phi_B$ are measured using $O_A$ as the center of the circle of magnetization.

(3) continue by estimating $O_C$ from $\theta_C$ and $\theta_C'$, and so on.

Figure 10:
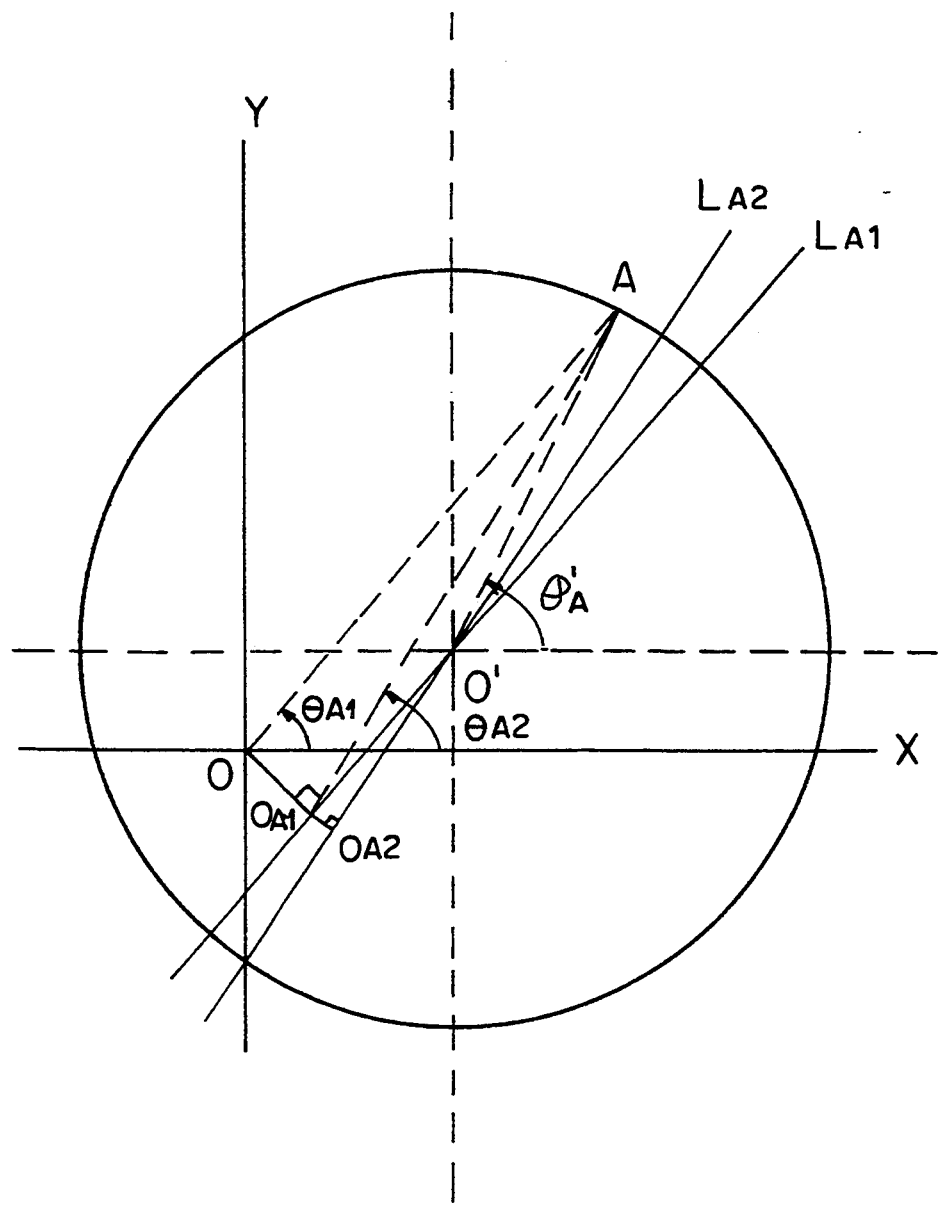
FIG. 10 shows, in a fifth preferred embodiment of the present invention, how to estimate recursively the location of the center when only one direction is known.

Referring to FIG. 10, in a fifth preferred embodiment, the recursive method is modified further so that it works even when vehicle 10 travels on a straight road, so that heading $O_A'$ determined by GPS receiver 18 remains constant. $\theta_{A1}$ is magnetic heading 26 as given by magnetic compass 16 before the estimation of the location of center $O_A$ is begun. A first solution line $L_{A1}$ is obtained from $\theta_A'$ and $\theta_{A1}$. This solution line yields, in the manner described above, an estimate for the center $O_{A1}$. Compensation computer 28 applies this estimate to determine corrected heading 32, which is sent to magnetic compass 16. Magnetic compass 16 in turn reports a new magnetic heading 26, shown in FIG. 10 as $\theta_{A2}$. A second solution line $L_{A2}$ is obtained from $\theta_A'$ and $\theta_{A2}$. Though an estimated $O_{A2}$ can be obtained in the manner described above, it is not necessary to do so. O', the center of the actual normalized circle of magnetization, lies at the intersection of $L_{A1}$ and $L_{A2}$.

Figure 11:
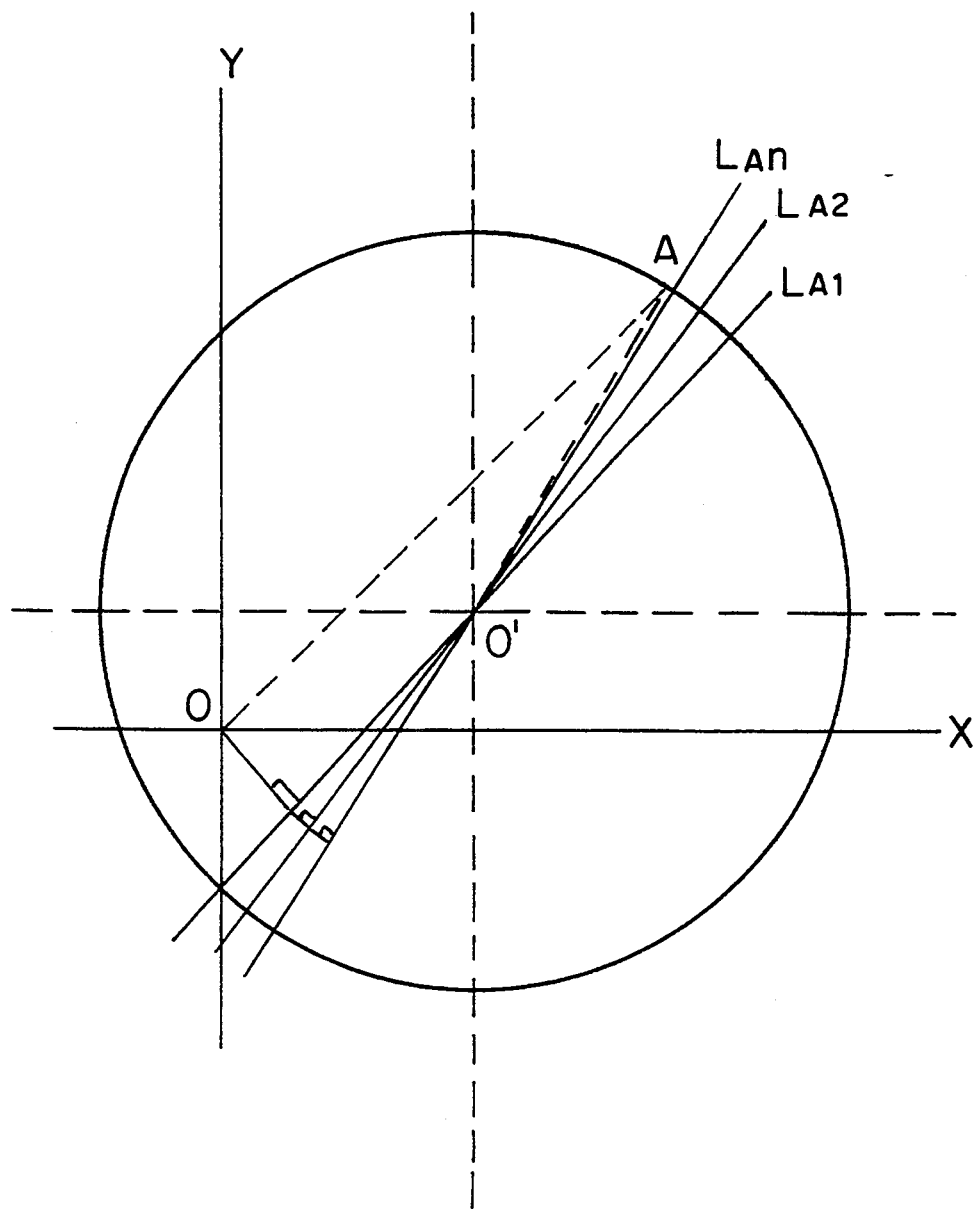
FIG. 11 shows, in a sixth preferred embodiment of the present invention, a variation of the recursive estimation method from only one direction as shown in FIG. 10.

Referring to FIG. 11, in a sixth preferred embodiment, continuing the process of successive estimation described with reference to FIG. 10 yields a solution line $L_{An}$ that converges to the line O'A. The actual center of the normalized circle of magnetization is the intersection of $L_{A1}, L_{A2}, \ldots L_{An}$. By estimating successive locations in this way, an error of measurement at any point in the estimation process has little effect on the final result.

Figure 12:
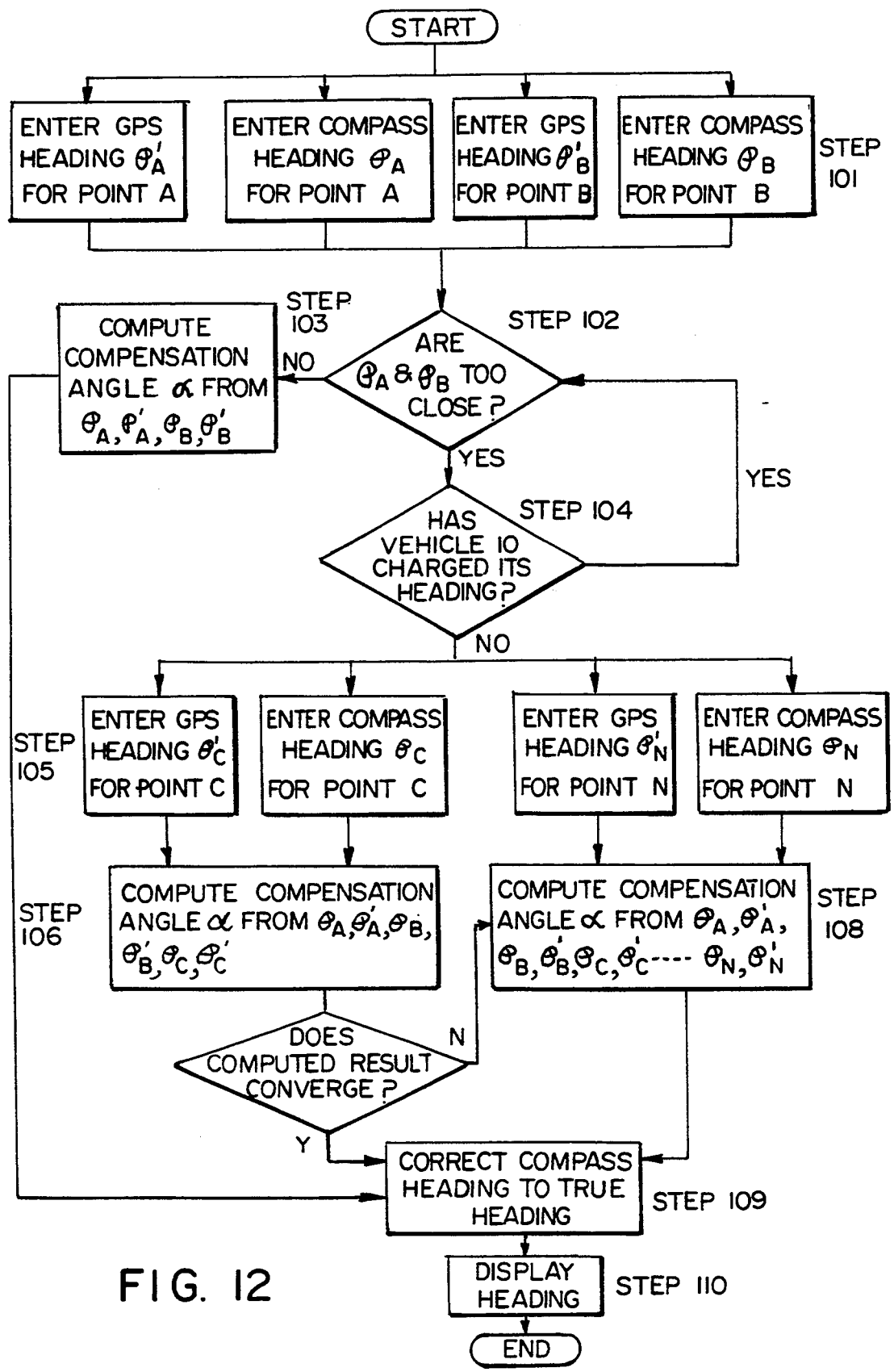
FIG. 12 is a flow chart that displays the steps by which the on-board navigation system uses a signal from the GPS to compensate for the magnetic deviation of a vehicle's compass.

Referring to FIG. 12, after the program starts, true and compass headings for whichever points they are available for are entered (step 101). In step 102 the program determines whether a pair of headings (either compass or true) are too close for a suitable determination of the calibration to be made. If they are far enough apart, compensation angle $\alpha$ is computed from the heading information (step 103), the compass heading is corrected to the true heading (step 109), and the latter is displayed (step 110) before the program ends. If the pair of headings is too close, the program determines whether the vehicle the vehicle has changed its heading (step 104). If it has, the program goes back to step 102 to calculate closeness.

In the vehicle has not changed its heading, true and compass headings for additional points are entered (step 105) and compensation angle $\alpha$ is computed (step 106) by the recursive method described above in relation to FIG. 7 or any of its modifications as described in relation to FIGS. 8–11. Additional points are used as necessary to reach a result that converges in step 107. As before, the compass heading is corrected to the true heading (step 109), and the latter is displayed (step 110) before the program ends.

Although the foregoing description has employed GPS as a source of actual positions from which true headings are derived, the present invention is not limited to GPS as a source of the true heading data. Any suitable source for determining true heading data may be used. For example, successive positions determined by Loran C may be substituted for GPS positions to determine true headings without departing from the spirit and scope of the invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A vehicle navigation system comprising:

a GPS receiver;

means for transforming outputs of said GPS receiver into a true heading;

means for indicating as magnetic heading and for transmitting said magnetic heading to a computing means;

said computing means, responsive to at least two values of said magnetic heading, for producing a compensation factor that, when used to compensate said magnetic heading, adjusts said magnetic heading to correspond to said true heading; and said computing means including means for normalizing said two values of said magnetic heading.

2. Apparatus according to claim 1, further comprising:

said computing means including means for successively approximating a center of a normalized circle of magnetization; and means for calculating said compensation factor from center.

3. Apparatus according to claim 1, wherein said at least two values of said magnetic heading include first and second values obtained at first and second true heading angles that are at least a predetermined value apart; and said predetermined value is at least 20 degrees.

4. Apparatus according to claim 3, further comprising:

said computing means including means for successively approximately a center of a normalized circle of magnetization, when said at least two values of said magnetic heading are less than said predetermined value apart; and said computing means employing said obtained first and second values when said obtained first and second values are at least said predetermined value apart.

* * * * *

UNITED STATES PATENT AND TRADEMARK OFFICE
CERTIFICATE OF CORRECTION

PATENT NO. : 5,339,246
DATED : August 16, 1994
INVENTOR(S) :
Wei-wen Kao

It is certified that error appears in the above-indentified patent and that said Letters Patent is hereby corrected as shown below:

Title page, item [73] Assignee: "Diahatsu-Nissan" should read --Daihatus-Nissan--.

Before item [57] Abstract, the Assistant Examiner "Michael Zawelli" should read --Michael Zanelli--.

Signed and Sealed this

Twenty-second Day of November, 1994

Attest:

BRUCE LEHMAN

Attesting Officer

Commissioner of Patents and Trademarks